United States Patent
McGinlay et al.

(10) Patent No.: US 11,010,731 B1
(45) Date of Patent: May 18, 2021

(54) SYSTEMS AND METHODS FOR PROCESSING GLOBAL FINANCIAL TRANSACTIONS

(71) Applicant: Wells Fargo Bank, N.A., San Francisco, CA (US)

(72) Inventors: James McGinlay, Staten Island, NY (US); Robert Ortiz, Clarks Green, PA (US); Barbara Stockler, Berwyn, PA (US); Joanne Strobel-Cort, Summit, NJ (US); Leonard J. Valentino, Stamford, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 678 days.

(21) Appl. No.: 15/435,683

(22) Filed: Feb. 17, 2017

(51) Int. Cl.
    *G06Q 20/10* (2012.01)
(52) U.S. Cl.
    CPC .................... *G06Q 20/10* (2013.01)
(58) Field of Classification Search
    CPC ...................................................... G06Q 20/10
    See application file for complete search history.

(56) References Cited

U.S. PATENT DOCUMENTS

| | | | | |
|---|---|---|---|---|
| 5,974,146 | A * | 10/1999 | Randle | G06Q 20/04 705/40 |
| 6,598,028 | B1 * | 7/2003 | Sullivan | G06Q 30/0601 705/26.1 |
| 7,494,050 | B1 * | 2/2009 | Bowen | G06Q 20/042 235/379 |
| 7,689,508 | B2 | 3/2010 | Davis et al. | |
| 7,966,231 | B2 | 6/2011 | Foster | |
| 7,996,317 | B1 * | 8/2011 | Gurz | G06Q 20/02 235/462.02 |

(Continued)

OTHER PUBLICATIONS

Ian L. Adamson, an Object-Oriented Financial Accounting Information System, 1993, (Year: 1993).*

(Continued)

*Primary Examiner* — Kenneth Bartley
*Assistant Examiner* — Gregory M James
(74) *Attorney, Agent, or Firm* — Foley & Lardner LLP

(57) ABSTRACT

A computer implemented method performed by a global transaction processing system includes receiving a transaction request from an originator, the transaction request includes transactional data. The method includes validating the transactional data to determine one or more parameters associated with the requested transaction. The method includes dynamically generating a transaction information request form, the transaction request form including one or more requests for specific transactional data from the originator based on the one or more parameters associated with the requested transaction. The method includes transmitting the transaction information form to the originator and receiving the requested specific transactional data from the originator. The method also includes validating the transaction request based on the received transaction request and the received specific transactional data to determine if the transaction request is valid, as well as processing the transactional request based on the transaction request being determined to be a valid transaction request.

24 Claims, 6 Drawing Sheets

(56) References Cited

U.S. PATENT DOCUMENTS

| | | |
|---|---|---|
| 8,050,997 B1 | 11/2011 | Nosek et al. |
| 8,249,990 B2 | 8/2012 | Digrigoli et al. |
| 8,311,911 B2 | 11/2012 | Tsagarakis et al. |
| 8,341,054 B2 | 12/2012 | Klein |
| 8,380,597 B2 | 2/2013 | Night et al. |
| 8,392,299 B2 | 3/2013 | Sorbe et al. |
| 8,527,336 B2 | 9/2013 | Kothari et al. |
| 8,818,868 B2 | 8/2014 | Faires et al. |
| 8,955,741 B2 | 2/2015 | Hansen et al. |
| 2003/0050972 A1* | 3/2003 | Felt .................. G06Q 30/06 709/203 |
| 2003/0055738 A1* | 3/2003 | Alie .................. G06Q 20/04 705/26.1 |
| 2003/0208440 A1 | 11/2003 | Harada et al. |
| 2005/0216397 A1* | 9/2005 | Micci-Barreca ....... G06Q 20/10 705/39 |
| 2006/0004655 A1* | 1/2006 | Alexander, IV ....... G06Q 20/00 705/39 |
| 2007/0078787 A1* | 4/2007 | Mersky .............. G06Q 30/04 705/75 |
| 2008/0133396 A1 | 6/2008 | De La Motte |
| 2010/0125514 A1 | 5/2010 | Blackhurst et al. |
| 2010/0243730 A1 | 9/2010 | Safahi |
| 2011/0184838 A1* | 7/2011 | Winters ............. G06Q 20/10 705/27.1 |
| 2011/0320358 A1* | 12/2011 | Harris .............. G06Q 20/042 705/45 |
| 2013/0036047 A1 | 2/2013 | Busher |
| 2013/0268419 A1* | 10/2013 | Menezes ............ G06Q 30/00 705/34 |
| 2014/0263618 A1* | 9/2014 | McCarthy ........... G06Q 40/02 235/379 |
| 2015/0339651 A1 | 11/2015 | Hampapur et al. |
| 2016/0055322 A1* | 2/2016 | Thomas .............. G06F 21/10 726/7 |
| 2016/0078439 A1* | 3/2016 | Vanska ............ G06Q 30/0633 705/44 |
| 2016/0210597 A1* | 7/2016 | Zhu ................. G06Q 20/10 |
| 2018/0198792 A1* | 7/2018 | Shah ................ H04L 63/10 |

OTHER PUBLICATIONS

"Ally Bank Introduces Ally Assist(SM) Customer Voice Interaction", Ally Financial, http://www.prnewswire.com/news/ally financial, May 18, 2015, 5 pages.

"EFT and Bank Wire Authorization", Fidelity Investments, URL:https://www.fidelity.com/bin-public/060_www_fidelity_com/documents/electronic-funds-transfer-and-bank-wire.pdf, Mar. 2015. 6 pages.

Crosman, Penny, USAA Teaches Its Virtual Assistant to Learn From Customers, http://www.americanbanker.com/issues/179_163/usaa-teachers-its-virtual-assistant-to-lear-from-customers-1069570-1.html, Aug. 22, 2014. 9 pages.

Humbolt State University, "Outgoing International Wire Request", https://www2.humboldt.edu/forms/sites/forms/files/International%20Wire%20Request%20Form.pdf. 3 pages.

Iyer, SA Sandhya, "Google Now automatically pulls your digital boarding pass", Gadgets360, Jan. 15, 2013. 3 pages.

Oanda, "Multi-Currency Accounts", https://oanda.secure.force.com/AnswersSupport?urlName=Multi-Currency-Accounts-1436196464448&language=en_US, 1996-2015. 6 pages.

Pohjola Banking, "Multicurrency account", https://www.pohjola.ee/en/banking/multicurrency-account, 2015. 1 page.

* cited by examiner

SYSTEMS AND METHODS FOR PROCESSING GLOBAL FINANCIAL TRANSACTIONS

BACKGROUND

With the rise of globalization, the number of international financial transactions is enormous. These transactions, occurring between multiple parties in multiple countries, can be complex to process due to differing financial requirements and regulations associated with different countries. Often, this can lead to transactions failing to be processed, requiring the transactions to be submitted again, requiring additional time and, potentially, fees and other costs associated with performing the transaction. One common point of failure in international transactions is a failure on the part of the originator to provide all of the information required by the receiving party. For example, certain countries associated with the recipient may require additional information not required in the originator's country of origin, and vice versa. Failure to provide this information often results in the transaction being unable to be processed, requiring the transaction to be performed again. However, in some instances the originator may not be fully aware of why the transaction failed, and again neglect to include the required information, resulting in yet another failure. Accordingly, it would be desirable to have systems and methods for determining what information is required based on the transactions, and, in some instances, an ability to automatically correct.

SUMMARY

According to one example embodiment, a computer implemented method performed by a global transaction processing system includes receiving a transaction request from an originator. The transaction request includes transactional data, which can include originator account information, originator identification information, a transaction amount, a transaction recipient, and/or transaction recipient account information. The method further includes validating the transactional data to determine one or more parameters associated with the requested transaction. The method also includes dynamically generating a transaction information request form, the transaction request form including one or more requests for specific transactional data from the originator based on the one or more parameters associated with the requested transaction. The method further includes transmitting the transaction information form to the originator and receiving the requested specific transactional data from the originator. The method also includes validating the transaction request based on the requested transaction request and the received specific transactional data to determine if the transaction request is valid, as well as processing the transactional request based on the transaction request being determined to be a valid transaction request. Processing the transactional request includes generating one or more data messages containing the transactional data and the requested specific transactional data. The data messages are configured to be readable by a receiving FI associated with the transaction recipient.

According to another example embodiment a system for processing global transaction includes an originating financial institution computing system. The originating financial institution computing system is configured to receive a global transaction request, the transaction request including transactional data. The transactional data includes originator account information, originator identification information, a transaction amount, a transaction recipient, and transaction recipient account information. The originating financial institution computing system is further configured to validate the transactional data to determine one or more parameters associated with the global transaction request and dynamically generate a transaction information request form. The transaction information request form including one or more requests for specific transactional data from the originator based on the one or more parameters associated with the global transaction request. The originating financial institution computing circuit further configured to validate the transaction request based on the received global transaction request and the requested specific transactional data to determine if the global transaction request is valid. The originating financial institution computing system additionally configured to process the transactional request based on the global transaction request being determined to be a valid transaction request. Processing the transactional request comprises generating one or more data messages containing the transactional data and the requested specific transactional data, the data messages configured to be readable by a receiving FI associated with the transaction recipient. The originating financial institution computing system further configured to transmit the processed transactional request to the recipient FI computing circuit.

According to another example embodiment a global transaction processing system includes an originating financial institution computing system. The originating financial institution computing system is configured to receive a global transaction request from a user device, the transaction request including transactional data. The originating financial institution computing system is further configured to validate the transactional data to determine one or more parameters associated with the global transaction request and dynamically generate a transaction information request form. The transaction information request form including one or more requests for specific transactional data from the originator based on the one or more parameters associated with the global transaction request. The originating financial institution computing system further configured to validate the transaction request based on the received global transaction request and the requested specific transactional data to determine if the global transaction request is valid. The originating financial institution computing system is additionally configured to process the transactional request based on the global transaction request being determined to be a valid transaction request. Processing the transactional request includes generating one or more data messages containing the transactional data and the requested specific transactional data. The data messages are configured to be readable by a receiving FI associated with the transaction recipient. The originating financial institution computing system is further configured to transmit the processed transactional request to the receiving FI computing system. The originating financial institution computing system further configured to determine if the global transaction request is automatically repairable based on the transaction request being determined to be invalid, and automatically repair the global transaction request based on the invalid transaction request being determined to be able to be automatically repairable. The originating financial institution computing system also configured to generate an error report based on the invalid global transaction request being determined to be unable to be dynamically repaired, wherein the generated error report is transmitted to the originator.

These and other features, together with the organization and manner of operation thereof, will become apparent from the following detailed description when taken in conjunction with the accompanying drawings.

DETAILED DESCRIPTION

Figure 1:
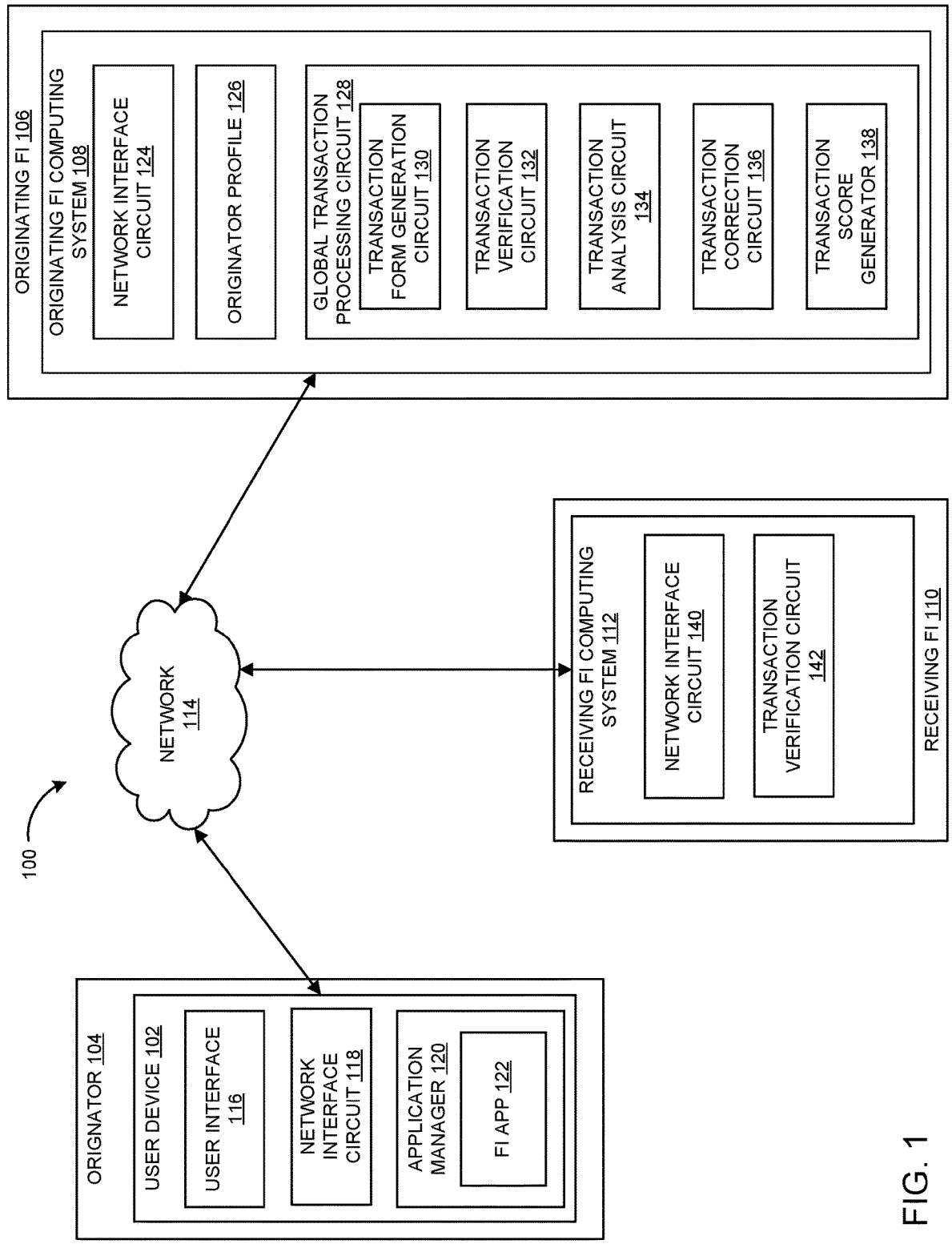
FIG. 1 is a block diagram of global transaction system, according to an embodiment.

Globalization has increased the amount of international transactions that occur every day. However, many countries, even in the globalized economy, continue to have individual regulations and requirements for international transactions, and particularly financial transactions, which can lead to failed transactions where the originator fails to include all necessary information. Further, where the transaction involves multiple transactions, the entire batch of transactions may be rejected due to missing information. This can result in the transactions not occurring in a timely fashion, which may have serious consequences where the transactions are critical, such as in international finance. Additionally, fees may be imposed by the requesting financial institution (FI), as well as an FI associated with the originator.

Referring generally to the figures, systems and methods for providing a global transactions platform are shown in various embodiments. According to various embodiments, a global transaction processing circuit associated with an originating FI can evaluate the proposed transactions and dynamically provide the originator with the requirements to successfully complete the requested transaction. The global transaction processing circuit may further be configured to automatically evaluate each requested transaction to determine if the transaction contains sufficient information to be processed and accepted by the recipient FI. In some instances, the global transaction processing circuit may include a transaction correction tool to allow the originating FI to automatically provide certain required information to complete the transactions, where the originating FI has access to the required information.

According to various embodiments, as described in further detail below, providing systems and methods for evaluating, processing, and dynamically modifying international transaction, can provide an improved interface between parties in an international transaction by reducing transactional failures associated with incomplete information being provided by the originator. By providing dynamically generated interfaces for individual transactions, additional value-add functionality can be achieved, as the originator can immediately realize what information is required for the transaction, and supply it. This can reduce failed transactions by ensuring the proper information is provided, thereby reducing time to complete the transaction, as well as cost associated with a failed transaction. Further, providing dynamic correction of some transactional errors can further reduce the number of failed transactions, especially where multiple transactions are initiated by an originator at once. Accordingly, the embodiments described herein solve the technical and internet-centric problem of providing a global transactional platform to allow for easier, more accurate, and more reliable (i.e., completed a higher percentage of the time the first time the transaction is submitted) international transaction requests.

FIG. 1 is a block diagram of a global transaction system 100, according to an embodiment. The global transaction system 100 may include a user device 102 associated with a transaction originator 104. The originator 104 may be an individual, or an entity, such as a corporation, FI, brokerage house, or any other entity which may initiate global transactions (e.g., a transfer of funds from a first account in a first country to a recipient having a second account in a second country). The global transaction system 100 may further include an originating FI 106 including an originating FI computing system 108, a receiving FI 110 including a receiving FI computing system 112, and a network 114. The user device 102, the originating FI computing system 108, and the receiving FI computing system 112 may each include a computer system (e.g., one or more servers, each with one or more processing circuits), each including a processor and a memory. As described herein, the originating FI 106 maintains accounts in a first country, and the receiving FI 110 maintains accounts in a second country that is different than the first country. Accordingly, any described transfer of funds between the originating FI 106 and the receiving FI 110 are international or global transfers.

The processors may be implemented as application specific integrated circuits (ASICs), one or more field programmable gate arrays (PFGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include database components, object code components, script components, or any other type of information structure for supporting the various activities and information structures described herein. The memory may be communicably connected to the processor and include computer code or instructions for executing one or more processes described herein.

The originating FI computing system 108 and/or the receiving FI computing system 112 may include a server-based computing system, for example, comprising one or more networked computer servers that are programmed to perform the operations described herein. The originating FI computing system 108 and/or the receiving FI computing system 112 may be implemented as a distributed computer system, where each function is spread over multiple computer systems.

The originating FI computing system 108 and/or the receiving FI computing system 112 may be one or more centralized servers connected to one or more of the other listed components within the global transaction system 100 via the network 114. In some embodiments, the network 114 may be an internet based network. For example, the components of the global transaction system 100 may all be in communication with a cloud-based network, as will be described in more detail below. In some embodiments, the network connections between the components are wired network connections, such as a TCP/IP network. In other embodiments, the network connections may be wireless network, such as Wi-Fi, Wi-Max, cellular (3G, 4G, LTE, CDMA), LoRA, ZigBee, Near Field Communication (NFC), Bluetooth, or any other applicable wireless network protocols. In some embodiments, the originating FI computing system 108 and/or the receiving FI computing system 112 may be hosted by a third-party.

The user device 102 may be any device associated with the originator 104 that can communicate with the network 114, and/or the originating FI 106. In some embodiments, the user device 102 may include a user interface on an internet accessible website. In other embodiments, the user device 102 may be a mobile device associated with the originator 104. Example mobile devices can include smartphones (e.g., iPhone®, Android® phones, Windows® phones, etc.), tablet computers (e.g., iPad®, Android® tablet, Microsoft Surface®, etc.), laptop computers, wearable device, or any other device capable of communicating with the network 114 and/or the originating FI 106. In one embodiment, the user device 102 is used to provide access to the originating FI 106. For example, the user device 102 may communicate with the originating FI 106 via the network 114.

The user device 102 includes a user interface 116, a network interface circuit 118, and an application manager 120. The user interface 116 may be any interface providing inputs and outputs within the user device 102. For example, the user interface 116 may be a touchscreen display associated with mobile device, such as a smartphone or tablet PC. In other examples, the user interface 116 may be a combination of a display and a separate input device, such as a keyboard. In still further examples, the user interface 116 may be an audio interface, such as a virtual assistant such as Apple's® Siri,® or other virtual assistants. The network interface circuit 118 facilitates data communications to and from the network 114. The network interface circuit 118 may be configured to communicate wirelessly to the network 114, such as via Wi-Fi, Bluetooth®, NFC, ZigBee, IR, RF, cellular (3G, 4G, LTE, CDMA), etc. In other embodiments, the network interface circuit 118 may communicate with the network 114 via a wired connection, such as via Ethernet, a LAN, a WAN, Firewire, USB, or another applicable wired interface. In some embodiments, data passing through the network interface circuit 118 is encrypted.

The application manager 120 is configured to manage one or more software applications (apps) associated with the user device 102. For example, the application manager 120 may manage an FI app 122. The FI app 122 may be a mobile banking application, associated with an FI used by the originator 104, such as originating FI 106. In one embodiment, the FI app 122 allows for direct communication between the user device 102 and the originating FI 106. In further examples, the FI app 122 may be a mobile wallet application. In one embodiment, the application manager 120 processes requests from the network interface circuit 118 to execute one or more applications. For example, the network interface circuit 118 may receive a request to open the FI app 122 to allow for the originating FI 106 to interface with the user device 102.

As described above, the originating FI computing system 108 is associated with the originating FI 106. The originating FI 106 may be a bank, a credit union, a brokerage house, a currency exchange, or any other FI. The originating FI 106 is responsible for processing a transaction requested by the originator 104, such as a global financial transaction (e.g. a financial transaction with a recipient in a different country than the originator 104). In some embodiments, the originator 104 may have an account established with the originating FI 106. In other embodiments, the originator 104 may select the originating FI 106 for a specific transaction based on the ability of the originating FI 106 to complete the transaction. Example transactions can include payments, money transfers, currency exchanges, credit swaps, or other transactions requiring funds to be transferred to or from a recipient in a different country than the originator 104.

The originating FI computing system 108 may process transaction requests presented to the originating FI 106. For example, the originating FI computing system 108 may process all global transactions associated with the originator 104. The originating FI computing system 108 may include a network interface circuit 124, an originator profile 126 and a global transaction processing circuit 128. The network interface circuit 124 facilitates data communications to and from the network 114. The network interface circuit 124 may be configured to communicate wirelessly to the network 114, such as via Wi-Fi, Bluetooth, NFC, ZigBee, IR, RF, cellular (3G, 4G, LTE, CDMA), etc. In other embodiments, the network interface circuit 124 may communicate with the network 114 via a wired connection, such as via Ethernet, a LAN, a WAN, Firewire, USB, or another applicable wired interface. In some embodiments, data passing through the network interface circuit 124 is encrypted.

The originator profile 126 may be configured to store a number of characteristics associated with the originator 104. For example, the originator profile 126 may be generated when the originator 104 opens an account with the originating FI 106. However, in other embodiments, the originator profile 126 may be dynamically created at the time the originator 104 requests to make a financial transaction. In one embodiment, the originator profile 126 may contain characteristics associated with the originator 104 such as personal identifying information (name, address, social security number, etc.), financial information (checking accounts, savings accounts, credit card accounts, money market accounts, etc.), asset information, previous transaction information, or any other information related to interactions between the originator 104 and the originating FI 106.

The global transaction processing circuit 128 is configured to process global transactions performed by the originating FI 106. In some embodiments, the global transaction processing circuit 128 can include multiple sub-circuits used to perform aspects of the global transaction. As shown in FIG. 1, the global transaction processing circuit 128 can include a transaction form generation circuit 130, a transaction verification circuit 132, a transaction analysis circuit 134, a transaction correction circuit 136 and a transaction score generator 138. The transaction form generation circuit 130 may be configured to generate a form based on the transaction being requested by the originator 104. For example, the transaction form generation circuit 130 may provide a dynamically generated form with specific information requests associated with a requested transaction. The dynamically generated form can be provided to the originator 104 via the user interface 116. However, in other embodiments, the dynamically generated form may be provided to the originator 104 in other formats, such as via physical documents. In one example, the transaction form generation circuit 130 may dynamically generate a form based on the transaction type. For example, for transfer of funds a first form may be generated, while for a credit request, a second form may be generated. Further, the transaction form generation circuit 130 may dynamically generate a form based on the countries and/or entities involved in the transaction. For example, a transaction between an individual in the United States of America and an individual in India may require certain data, while the same transaction between corporations may require still other data. As another example, a transaction between an individual in the United States of America and an individual in India may require certain data, while a transaction between an individual in the United States of America and an individual in Canada may require different information. By evaluating the transaction type and/or the parties involved, the transaction form generation circuit 130 can provide a comprehensive form to the originator 104 to successfully perform the transaction. In other embodiments, the transaction form generation circuit 130 may evaluate the transaction being requested and provide the originator 104 with a pre-defined form that best fits the requested transaction. For example, the transaction form generation circuit 130 may have access to a repository of previously generated forms, which the transaction form generation circuit 130 can select from based on analyzing the requested transaction. The transaction form generation circuit 130 can select the best form based on certain criteria associated with the requested transaction, such as transaction type, transaction origin and destination countries, originator 104 type, recipient or receiving FI 110 type, etc.

The transaction verification circuit 132 is configured to verify the transaction requested by the originator 104. For example, the transaction verification circuit 132 may be configured to receive information provided by the originator 104 regarding the requested transaction. In some arrangements, the originator 104 may provide the information via the user interface 116. For example, the originator 104 may input data related to the transaction into a form generated by the transaction form generation circuit 130. The originator 104 may then submit the generated form back to the originating FI computing system 108, where it is interpreted by the transaction verification circuit 132. The transaction verification circuit 132 may analyze the transactional data provided by the originator 104 to determine if the requested transaction is a valid one. For example, the transaction verification circuit 132 may evaluate the current accounts of the originator 104 to ensure that the proper funds are available where the transaction is a transfer of funds form the originator 104 to another party. Further, the transaction verification circuit 132 may evaluate the data provided by the originator 104 to ensure that the originator 104 is in fact the person making the request. Additionally, the transaction verification circuit 132 may query the receiving FI 110 to ensure that the receiving FI 110 is capable of handling the transaction. In some arrangements, the transaction verification circuit 132 may determine if the receiving FI 110 is a valid FI, or if the receiving FI 110 is a reputable FI.

In some arrangements, the transaction verification circuit 132 may only determine if the general requirements associated with the requested transaction are met. The transaction information may then be provided to the transaction analysis circuit 134. The transaction analysis circuit 134 may be configured to provide additional analysis related to the requested transaction. For example, the transaction analysis circuit 134 may evaluate transactional data such as transaction type, the origin of the transaction, the destination of the transaction, the originator 104 and recipient party types, etc. Based on the evaluation, the transaction analysis circuit 134 may determine if sufficient information has been provided by the originator 104 to perform the transaction. In some arrangements, the transaction analysis circuit 134 is configured to access one or more databases to determine all the information that is required to complete the requested transaction, based on the evaluated transactional data.

In other arrangements, the transaction analysis circuit 134 is configured to communicate with one or more databases or other repository to access previous transactions with similar characteristics to the requested transaction. For example, where the transaction is fund transfer between an individual in the U.S.A. and a company in India, the transaction analysis circuit 134 may access a database containing information related to similar transaction that were performed in the past. The transaction analysis circuit 134 may then use the previous similar transactions to analyze the requested transaction to determine if the requested transaction contains the required information to be successfully processed. In some arrangements, the transaction analysis circuit 134 may reject the requested transaction where the requested transaction is likely to be deemed deficient by the receiving FI 110, or the originating FI 106. In some arrangements, the transaction analysis circuit 134 instructs the originating FI computing system 108 to communicate to the originator 104 that the requested transaction is defective. In one embodiment, the originating FI computing system 108 may inform the originator 104 that the requested transaction is defective by transmitting a message to the user device 102 via the network interface circuit 124. In other examples, the transaction analysis circuit 134 may note any potential defects within the transaction request and provide the information to the transaction correction circuit 136.

The transaction correction circuit 136 may be configured to receive the analysis of the requested transaction from the transaction analysis circuit 134. For example, the transaction analysis circuit 134 may transmit a list of missing information to the transaction correction circuit 136. In other examples, the transaction analysis circuit 134 transmits a report indicating the defective portions of the requested transaction to the transaction correction circuit 136. The transaction correction circuit 136 analyzes the information received from the transaction analysis circuit 134 and determines if the defects in the requested transaction can be automatically corrected. For example, where the originator 104 failed to provide certain personal identifying information (PII) in the requested transaction, the transaction correction circuit 136 may be able to automatically provide that information to allow the requested transaction to be completed. In one embodiment, the transaction correction circuit 136 is in communication with the originator profile 126, allowing the transaction correction circuit 136 access to information related to the originator 104. The transaction correction circuit 136 may then utilize that information to correct any defects within the requested transaction, where possible. In some arrangements, the transaction correction circuit 136 may obtain the information required to correct the defects of the requested transaction and send a message to the originator 104, such as via the user device 102, explaining the modifications, and requesting permission to submit the corrected transaction request. In other arrangements, the originator 104 may initially what define what, if any, PII within the originator profile 126 may be automatically used by the global transaction processing circuit 128 without requiring permission from the originator 104. This can allow the transaction correction circuit 136 to automatically correct certain defects within a requested transaction, thereby increasing the efficiency of the requested transaction, as well as making the transaction process easier on the originator 104.

In some examples, the transaction correction circuit 136 may not be able to automatically correct potential defects within the requested transaction identified by the transaction analysis circuit 134. Where the transaction correction circuit 136 is unable to automatically correct the defects within requested transaction, the transaction correction circuit 136 may determine what additional information is needed to correct the defects associated with the requested transaction. The transaction correction circuit 136 may then provide a list of the required information to the originator 104, such as via the user device 102. In some arrangements, the transaction correction circuit 136 may be configured to generate one or more inputs, such as dialog boxes, that relate to the information required to correct the defects within the requested transaction, thereby allowing the originator 104 to provide the required information. The originator 104 can then submit the information back to the originating FI computing system 108 for processing. In some arrangements, the information is provided to the user via the user device 102. For example, the transaction correction circuit 136 may be configured to generate the one or more inputs, and display the inputs on the user interface 116. In some arrangements, the one or more inputs may be displayed via the FI app 122.

The transaction score generator 138 may be configured to assign a score to each transaction requested by the originator 104. In one embodiment, the score may be associated with the number of defects associated with the each requested transaction. For example, the score may reflect the number of defects in a given requested transactions, such that a score of four would indicate that there were four defects. In other examples, the score may be a weighted numerical value that is based on multiple parameters, such as number of defects, complexity of requested transaction, amount of transaction, etc. The parameters may be evaluated and a number generated associated with a score of the requested transactions. The score may be a numerical value on a sliding scale, such as one to ten, where ten represents a high-quality transaction request, and one equals the lowest quality transaction request. While the above examples describe a numerical score, other types of scores may be generated such as letter scores (e.g. A, B, C, D, F), word scores (e.g. excellent, good, average, below average, poor, etc.), or other score types that convey an evaluation of a given requested transaction.

The scores may be used to provide a baseline of financial competence associated with the originator 104. For example, if the originator 104 consistently achieves low scores, indicating multiple defects associated with a requested transaction, the global transaction processing circuit 128 may modify the information requested from the originator 104 before a transaction is processed. In other arrangements, if the originator 104 consistently achieves low scores, indicating multiple defects associated with a requested transaction, the global transaction processing circuit 128 may restrict the types of transactions that the originator 104 is allowed to request. For example, where the originator 104 has consistently low scores, the global transaction processing circuit 128 may not allow the originator 104 to perform batch transactions. In other arrangements, if the originator 104 has consistently high scores, the global transaction processing circuit 128 may allow the originator 104 to perform certain transactions, such as batch transactions. In some arrangements, the transaction score generator 138 may generate scores for different types of transactions. For example, the originator 104 may have high scores for transaction to one country, but low scores for transactions to another country. Accordingly, the global transaction processing circuit 128 can receive the scores from the transaction score generator 138, and modify how transactions to different countries are handled. For example, the transaction form generation circuit 130 may highlight a field that is commonly not provided, or incorrectly provided. This can help to ensure that the originator 104 provides the correct information initially to the originating FI 106 when requesting the transaction.

Still referring to FIG. 1, the receiving FI 110, as described above, includes a receiving FI computing system 112. The receiving FI computing system 112 includes a network interface circuit 140 and a transaction verification circuit 142. The network interface circuit 140 facilitates data communications to and from the network 114. The network interface circuit 140 may be configured to communicate wirelessly to the network 114, such as via Wi-Fi, Bluetooth, NFC, ZigBee, IR, RF, Cellular (3G, 4G, LTE, CDMA), etc. In other arrangements, the network interface circuit 140 may communicate with the network 114 via a wired connection, such as via Ethernet, a LAN, a WAN, Firewire, USB, or another applicable wired interface. In some arrangements, data passing through the network interface circuit 140 is encrypted. The transaction verification circuit 142 is configured to process a requested transaction received from the originating FI computing system 108. The transaction verification circuit 142 can evaluate the received requested transaction and verify that the transaction is valid.

Figure 2:
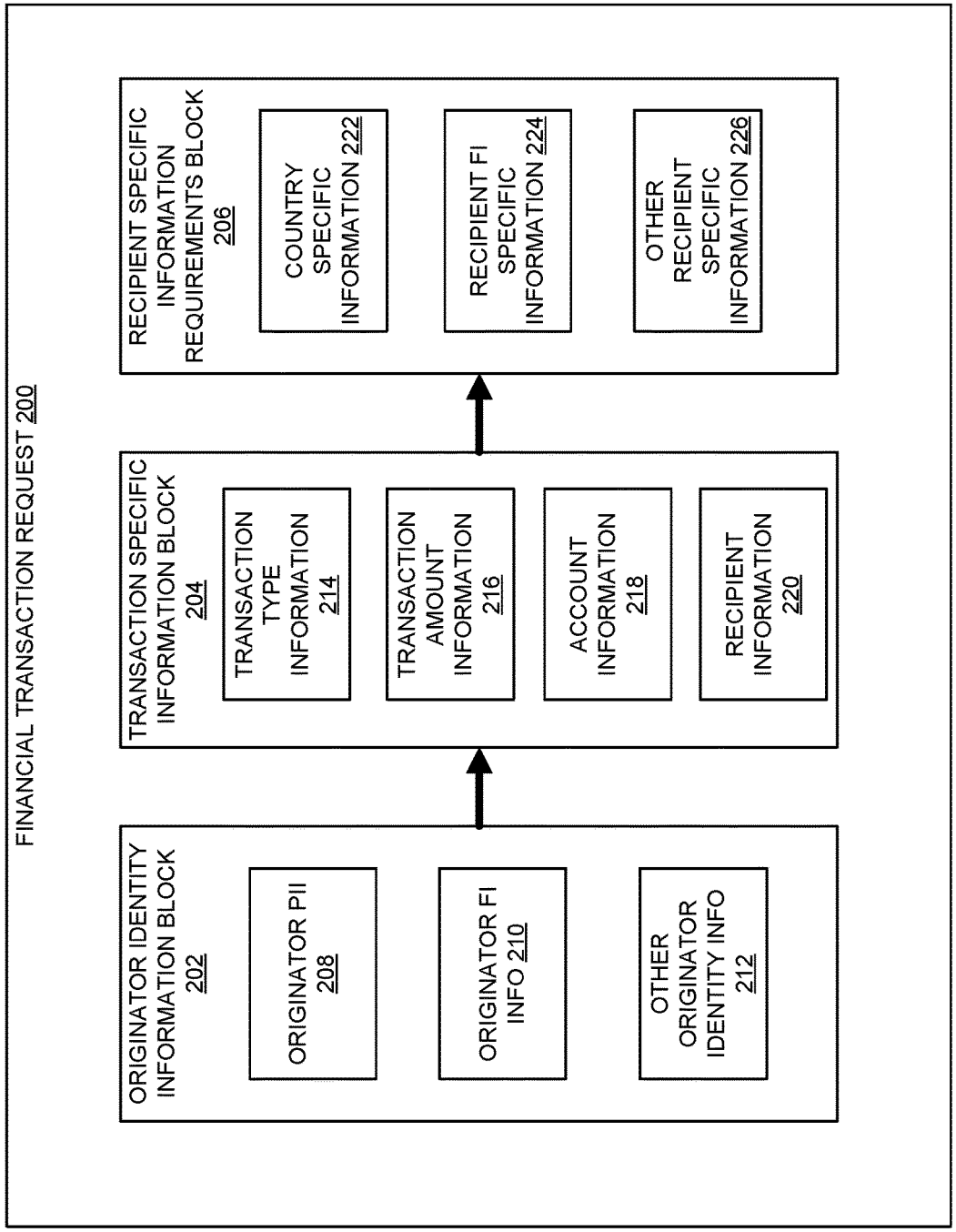
FIG. 2 is a block diagram of an example financial transaction request, according to an embodiment.

Turning now to FIG. 2, a block diagram illustrating an example financial transaction request 200 is shown. The financial transaction request 200 includes data blocks, such as an originator identity information block 202, transaction specific information block 204, and a recipient specific information requirements block 206. However, it is contemplated that other financial transaction requests may include more or fewer data blocks, as required. The originator identity information block 202 may include originator PII 208, originator FI information 210, and other originator identity information 212. However, it is contemplated that the originator identity information block 202 may include more information or less information, as needed. The various data blocks may be packaged in a single data file, which may be encrypted.

The originator PII 208 can include information about the originator 104 that serves to identify the originator 104. This can include PII such as social security number, driver's license number, passport number, photo ID, biometric data (fingerprints, eye scans, voice recordings), phone number, or other PII which serves to identify the originator 104. The originator FI information 210 can include information relating to the FI associated with the originator 104, such as FI name, address, tax ID number, phone number, FDIC number, bank identification number (BIN), routing number, or other information relating to the identity of the originator 104 FI. The other originator identity information 212 may include any other information related to the originator 104 that may be required to complete a financial transaction.

The transaction specific information block 204 may include one or more of transaction type information 214, transaction amount information 216, account information 218, and recipient information 220. The transaction type information 214 may include data related to the type of transaction being requested. Example transaction types can include transfers of funds, transfers of other financial instruments (securities, bonds, etc.), requests for payment, credit based transactions, loan requests, invoice payments, currency swap, etc. The transaction amount information 216 may include data related to a value associated with the transaction. For example, the value of money being transferred, the amount of credit requested, the amount of currency being exchanged, etc. The account information 218 can include information relating to an account associated with the originator 104, such as account numbers, routing numbers, account balances, or other information related to the account of the originator 104 to be used to process the transaction. Finally, the recipient information 220 may include data related to the intended recipient associated with the requested transaction. The recipient information 220 may include the name of the recipient, an account of the recipient, a financial institution associated with the recipient, or other information related to the recipient. In one embodiment, the recipient information 220 includes information about a country associated with the recipient. The recipient information 220 may further include information related to the FI associated with the recipient. For example, information such as FI name, address, tax ID number, phone number, FDIC number, bank identification number (BIN), routing number, or other information relating to the identity of the receiving FI 110 may be included in the recipient information 220.

The recipient specific information requirements block 206 may include information related specifically to the recipient. Specifically, the recipient specific information requirements block 206 may include data that is required by the recipient to process the requested financial transaction. For example, the recipient specific information requirements block 206 may include country specific information 222, receiving FI specific information 224, and/or other recipient specific information 226. The country specific information 222 may include information that is required for specific transaction in a given country. For example, if the request is a payment to a recipient in India, the financial transaction request requires a purpose of payment code. In other examples, other countries may impose specific requirements on the financial transaction request 200, such as payment purposes, what the payment is for, the origin of the funds used in the payment, etc. The receiving FI specific information 224 may include information specifically required by the receiving FI 110, such as additional PII associated with the originator 104, specific currencies to be used, etc. Finally, other recipient specific information 226 includes all other information required by the recipient to complete the transaction. The other recipient specific information 226 may include information specifically requested by the recipient, such as an associated purchase or transaction number, requested currency, etc.

Figure 3:
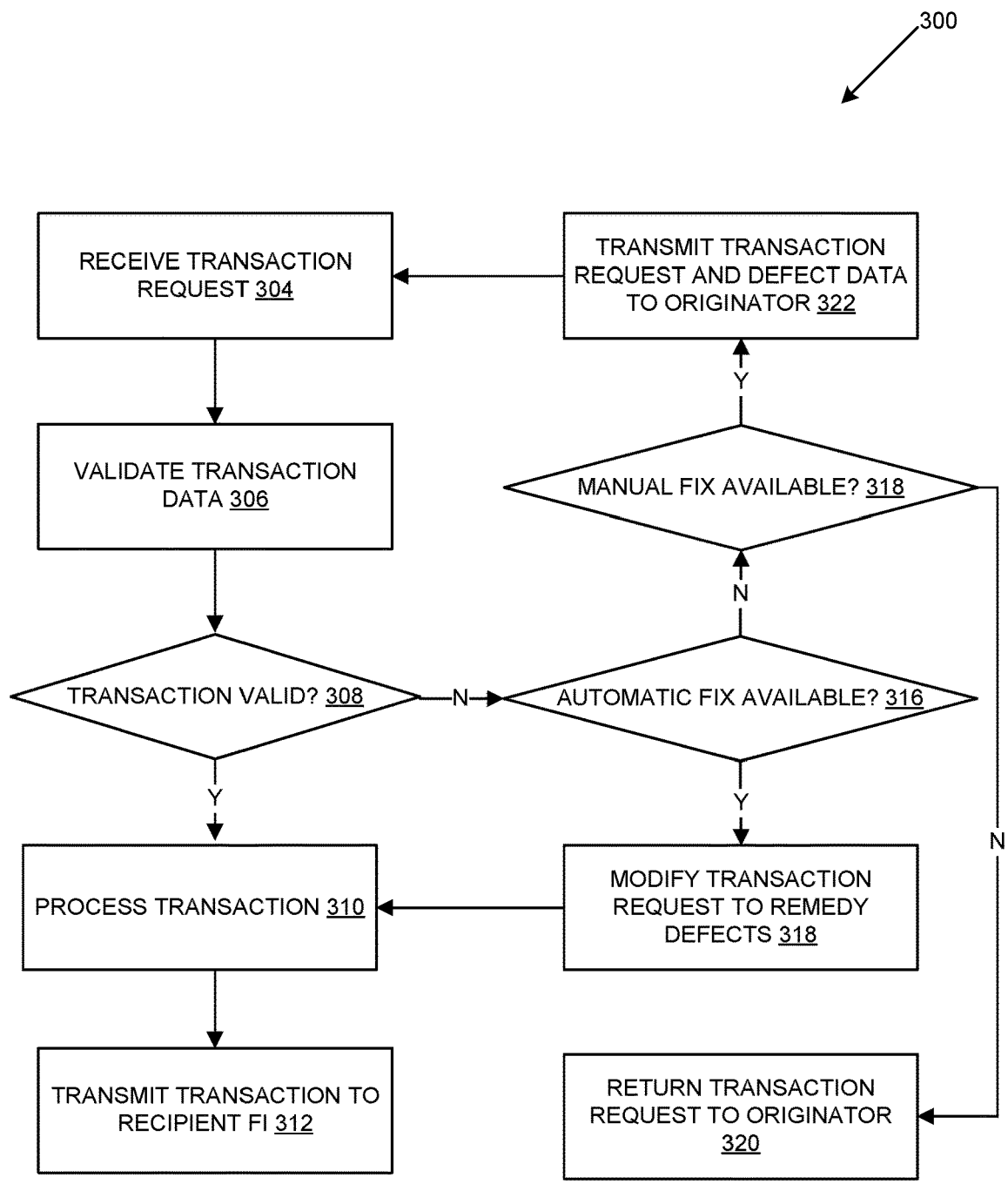
FIG. 3 is a flow diagram of a transaction request correction process, according to various embodiments.

FIG. 3 is a flow chart illustrating a transaction request correction process 300, according to some embodiments. For clarity and brevity, the method 300 is discussed below in connection with the system described in FIG. 1. The method 300 is performed by the originating FI computing system 108. The method 300 begins when the originating FI computing system 108 receives a transaction request at 304. In one example, the originator 104 may enter a transaction request which is then provided to the originating FI computing system 108. In one embodiment, the originator 104 may enter the transaction request via the user device 102. For example, the originator 104 may enter the transaction request via the FI app 122 on their mobile device. In some arrangements, the FI app 122 may be configured to provide a custom form based on the transaction type for the customer to complete in order to enter the transaction request. The creation of custom forms will be described in more detail below. In other arrangements, the originator may enter the transaction using an interface on a banking device, such as an automatic teller machine (ATM) or an automatic banking machine. The originator 104 may provide transaction data such as originator identity information, transaction specific information (e.g. transaction amount, accounts, etc.), and recipient specific information, such as recipient identification, recipient location, etc, within the transaction request.

The originator 104 may transmit the request to the originating FI 106. In one embodiment, the originator 104 can transmit the request via the user device 102. For example, the originator 104 may transmit the request to the originating FI 106 via the FI app 122. After receiving the transaction request at 304, the originating FI 106 validates the associated transaction data at 306. In one embodiment, the originating FI 106 may determine if the transaction is valid via the transaction verification circuit 132 and/or the transaction analysis circuit 134, as described above. Specifically, the originating FI 106 looks to the transaction data provided by the originator 104, along with the type of transaction being requested. For example, the originating FI 106 may determine the type of transaction and the recipient of the transaction based on information provided within the transaction request. Based on the transaction type and intended recipient, the originating FI 106 can validate the transaction data.

The originating FI 106 determines if the transaction request is valid based on the provided transaction data at 308. The originating FI 106 may determine that the request is valid where sufficient information is provided to complete the transaction. In further examples, the originating FI 106 may evaluate the transaction request to ensure that the information provided is correct. If the originating FI 106 determines that the information provided does not contain any errors, the originating FI 106 may determine that the request is valid. If the transaction is valid, the originating FI 16 processes the transaction at 310, and transmits the processed transaction to the receiving FI 110 at 312. In one embodiment, processing the transaction includes organizing the data form the transaction request into a data packet recognizable and readable by the receiving FI 110. For example, the originating FI 106 may process the data from the transaction request such that the data is configured as a Society for Worldwide Interbank Financial Telecommunications (SWIFT) message. A SWIFT message can be used to direct the transaction message to the receiving FI 110 in a manner that the receiving FI 110 will be able to understand. In other examples, the data may be configured as a Telex message, a Fedwire message, a Ripple message, a CHIPS message, or any other message used for communicating transactions between the originating FI 106 and the receiving FI 110. Processing the request may further include authorizing a transfer of funds from an account associated with originator 104 to the receiving FI 110. Additionally, processing the request may further include determining a path to the receiving FI 110, via one or more intermediaries.

In some embodiments, one or more intermediaries may be between the originating FI 106 and the receiving FI 110, particularly where the originating FI 106 and the receiving FI 110 are in different countries and do not have an existing business relationship. The intermediaries may be institutions that have a business relationship with both the originating FI 106 and the receiving FI 110, and that can facilitate the completion of the requested transaction between the two. The intermediaries may be FIs, brokerage houses, third party transaction facilitators, governmental agencies, or other institutions that are capable of facilitating financial transactions between the originating FI and the receiving FI. In some examples, multiple intermediaries may be required to get a transaction from the originating FI 106 to the to the receiving FI 110, and vice-versa. In some instances, the intermediaries may also have specific information requests which the originating FI 106 will need to provide. The originating FI 106 may be aware of the information required to complete the transaction using intermediaries, and may require the originator 104 to provide additional information if needed, as described below.

If the originating FI 106 determines that the transaction is not valid at 308, the originating FI 106 determines if the request can be automatically fixed at 314. In one embodiment, the transaction correction circuit 136 evaluates the defects associated with the received request to determine if the request can be automatically fixed. For example, where the transaction is missing information, such as PII information, the transaction correction circuit 136 may access the originator profile 126, as described above, to determine if the information is available to be used in correcting any defects associated with the transaction request. If an automatic fix is determined to be available, the originating FI 106 modifies the received transaction request at process block 316. Modifying the requested transaction can include providing the missing information previously provided by the originator 104. Once the requested transaction has been modified, and the defects corrected, the transaction is processed at 310, and transmitted to the receiving FI 110 at 312.

If the originating FI 106 determines that an automatic fix is not available, the originating FI 106 determines if a manual fix is available 318. If a manual fix is not available, such as when the defects are too significant to allow for simple corrections to be made, the transaction request is returned to the originator 104 at 320. In some arrangements, the transaction request may be returned with a message indicating that the transaction request failed. In some arrangements, the message may further provide a list of reasons why the request failed to allow the originator 104 to correct the defects in a subsequent transaction request. If the originating FI 106 determines that a manual fix is available, the originating FI 106 may return the transaction request to the originator 104 with an ability to cure the defects at 322. For example, the request may be returned along with one or more inputs that allow the originator 104 to provide the required information, and cure the subsequent defects. In one embodiment, the transaction request is returned via the FI app 122, along with instructions to provide additional information required to complete the transaction. The originator 104 may then transmit the request back to the originating FI 106 at 304.

Figure 4:
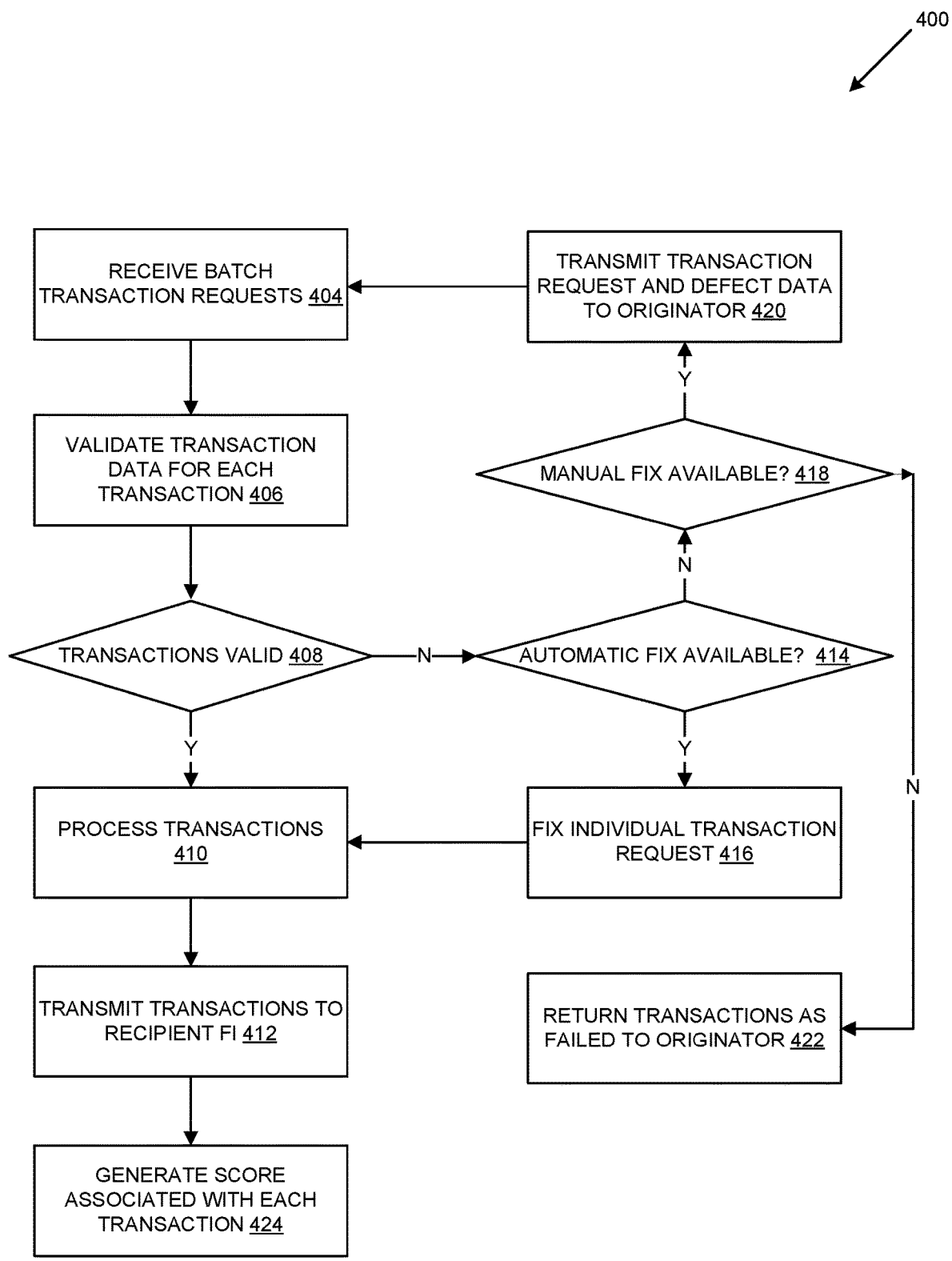
FIG. 4 is a flow diagram illustrating a process for processing batch transactions, according to various embodiments.

FIG. 4 is a process chart illustrating a process for processing batch transaction 400, according to some embodiments. For clarity and brevity, the method 400 is discussed below in connection with the system described in FIG. 1. The originating FI 106 receives a batch of transaction requests at 404. The originator 104 may enter a batch of transaction requests. For example, the originator 104 may submit a number of payments to for paying various invoices or other bills. In other examples, the originator 104 may submit multiple fund transfers at one time. In one embodiment, the originator 104 may enter multiple transaction requests via the user device 102 as a batch transaction request. For example, the originator 104 may enter the transaction requests via the FI app 122. In other arrangements, the originator 104 may upload the transaction requests to the originating FI 106 as a single file (e.g., a single file containing information relating to multiple discrete transactions). In other arrangements, the transaction requests may be entered into the originating FI 106, such as via the FI app 122, one at a time, and then submitted together once all the transaction requests have been entered. In some arrangements, the FI app 122 may be configured to provide a custom form based on the transaction type for the originator 104 to complete in order to enter a transaction request. For example, if the originator 104 indicates that they would like to make a payment, the FI app 122 may provide a custom form with general information required to process a payment. The originator 104 may then be able to enter the data directly into the FI app 122 via the user interface 116. The originator 104 may provide transaction data such as originator identity information, transaction specific information, and recipient specific information, as described above, within the custom form to generate the transaction request. In other arrangements, the originator 104 may provide basic transaction data associated with each of the transaction requests.

Additionally, the originator 104 can transmit the transaction requests to the originating FI 106. In one embodiment, the originator 104 can transmit the transaction requests via the user device 102. For example, the originator 104 may transmit the transaction requests to the originating FI 106 via the FI app 122. The originating FI validates the transaction data associated with each transaction request at 406. In one embodiment, the originating FI 106 may determine if the transaction data is valid via the transaction verification circuit 132 and/or the transaction analysis circuit 134, as described above. Specifically, the originating FI 106 looks to the transaction data provided by the originator 104, along with the type of transactions being requested. For example, the originating FI 106 may determine the type of transactions and the recipient of the transactions based on information provided within the transaction requests. Based on the transaction type and intended recipient, the originating fi 106 can validate the transaction data for the individual transaction requests.

The originating fi 106 determines if each transaction request is valid based on the provided transaction data at 408. If a transaction is valid, the originating FI 106 processes the transaction at 410, and transmits the processed transaction to the receiving FI 110 at 412. If the originating FI 106 determines that the transaction is not valid at 408, the originating FI 106 determines if the request can be automatically fixed at 414. In one embodiment, the transaction correction circuit 136 evaluates the defects associated with the received request to determine if the request can be automatically fixed. For example, where the transaction is missing information, such as PII information, the transaction correction circuit 136 may access the originator profile 126, as described above, to determine if the information is available to be used in correcting any defects associated with the transaction request. If an automatic fix is determined to be available, the originating FI 106 modifies the transaction request to cure the defects at 416. Modifying the requested transaction can include providing the missing information previously provided by the originator 104. Once the requested transaction has been modified, and the defects corrected, the transaction is processed at process block 410, and transmitted to the receiving FI 110 412.

If the originating FI 106 determines that an automatic fix is not available, the originating FI 106 determines if a manual fix is available at 418. If the originating FI 106 determines that a manual fix is available, the originating FI 106 may return the transaction request to the originator 104 with an ability to cure the defects at 420. For example, the transaction request may be returned along with one or more inputs that allow the originator 104 to provide the required information, and cure the subsequent defects. In one embodiment, the transaction request is returned via the FI app 122, along with instructions to provide additional information required to complete the transaction. The originator 104 may then transmit the request back to the originating FI 106 at 404. If a manual fix is not available, such as when the defects are too significant to allow for simple corrections to be made, the transaction request is returned to the originator 104 as a failed transaction at 422. In some arrangements, the transaction request may be returned with a message indicating that the transaction request failed. In some arrangements, the message may further provide a list of reasons why the request failed to allow the originator 104 to correct the defects in a subsequent transaction request.

After the transactions have been processed, the originating FI 106 can generate a score associated with each transaction request at 424. In one embodiment, the transaction score generator 138 may generate the score associated with each transaction. The score can be determined based on the number and types of defects associated with each transaction request. In one embodiment, a low score may indicate that there were significant defects associated with the transactions, and a high score may indicate that the transaction requests were relatively defect free, or that the defects were minor. In addition to the number and type of defects, the score may also be dependent on the type and complexity of the individual transaction requests presented by the originator 104. The score may be used by the originating FI 106 to modify the interactions with the originator 104. For example, if the originator 104 has low scores when processing a large batch of transaction requests, the originating FI 106 may limit the number of transaction requests that can be made at one time by the originator 104. In other arrangements, the originating FI 106 may modify the transaction request forms provided to the originator 104 to ensure that the proper information is included in the transaction requests. The score may also be used to provide a confidence score to the originator 104. For example, if the originator submits a batch transaction, the originating FI computing system 108 may return a score indicative of the chances of the transactions being processed without requiring repair or re-submissions. Based on the score, the originator can elect whether or not to proceed with the transactions request in their current state.

Figure 5:
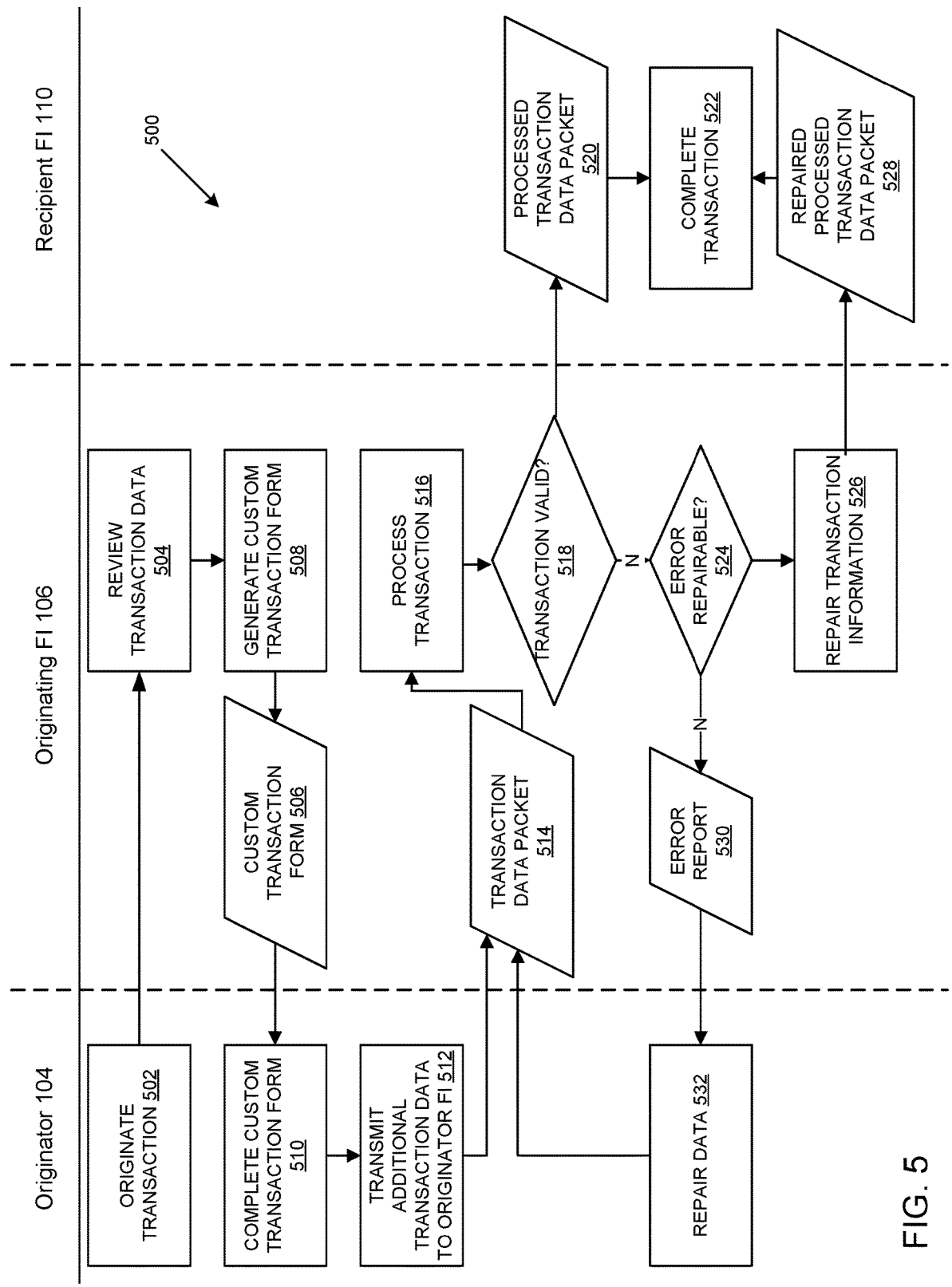
FIG. 5 is a flow diagram illustrating an example implementation of the method shown in FIG. 3.

FIG. 5 is a flow diagram illustrating an example implementation 500 of the method shown in FIG. 3. For clarity and brevity, the implementation 500 is discussed below in connection with the system described in FIG. 1. Specifically, in regards to the originator 104, the originating FI 106 and the receiving FI 110. The originator 104 originates the transaction at 502. In one embodiment, the originator 104 can originate the transaction by providing information to the originating FI 106. The information may include transactional data, such as originator identity information, transaction specific information, and/or recipient specific information requirements, as described above. However, it is contemplated that the transactional data may include additional data. In one embodiment, the originator 104 may provide the transactional data via the user device 102. For example, the originator 104 may enter all the information associated with the transaction using the FI app 122. In some arrangements, the originator 104 may simply provide a request to perform a certain type of transaction, along with basic data related to the transaction, such as the type of transaction, the parties, and information associated with the parties. However, in other arrangements the originator 104 may provide the data using other means, such as via a web-portal associated with the originating FI 106, or even by providing paper documents directly to the originating FI 106.

The originating FI 106 can review the transactional data provided by the originator 104 at 504. For example, the originating FI 106 may evaluate the type of transaction to determine what additional information might be necessary. The originating FI 106 may also evaluate other parameters associated with the transaction request, such as the parties, and the countries involved in the transaction. In one embodiment, the review is performed by the transaction verification circuit 132. In other arrangements, the transaction form generation circuit 130 may review the transactional data provided by the originator 104. Based on the review by the originating FI 106, a custom transaction form 506 may be generated at 508. The custom transaction form 506 may be generated by the transaction form generation circuit 130. The custom transaction form 506 may be generated to include fields associated with additional data required based on the review of the provided transactional data at 504. For example, the custom transaction form 506 may be configured to request additional data based on the determined transaction type, parties, countries involved, or any other transactional data provided by the originator 104. For example, certain countries may require additional information to complete a given transaction, based on the transaction type, such as India. India requires a payment purpose be provided when the transaction is a payment. Thus, the custom transaction form 506 may be generated to include a field for "payment purpose" to ensure that the information is provided by the originator 104. Other countries and/or other transaction types also may require additional information, and the above examples should not be limited to any particular country and/or transaction type discussed herein. The custom transaction form 506 is provided to the originator 104, who completes the custom transaction form 506 at 510. For example, the originator 104 may input additional transactional data required by the custom transaction form 506 to complete the transaction.

The originator 104 transmits the custom transaction form 506 containing the additional transactional data as transaction data packet 514 at 512. In one embodiment, the transaction data packet 514 includes all the information required to complete the transaction. For example, the transaction data packet 514 can include transaction data such as originator identity information, transaction specific information, and recipient specific information requirements. The originating FI 106 receives the transaction data packet 514 and processes the transaction at 516. In one embodiment, the originating FI 106 processes the transaction based on the transactional data within the transaction data packet 514. Further, processing the transaction may include determining if the transaction is valid. In one embodiment, the originating FI 106 determines if the transaction is valid via the transaction verification circuit 132 and/or the transaction analysis circuit 134, as described above. Specifically, the originating FI 106 looks to the transaction data provided by the originator 104, along with the type of transaction being requested. For example, the originating FI 106 may determine the type of transaction and the recipient of the transaction based on information provided within the transaction data packet 514. Based on the transaction type and intended recipient, the originating FI 106 can validate the transaction data.

The originating FI 106 determines if the transaction is valid, based on the data in the transaction data packet 514 at 518. Similar to above, the originating FI 106 may utilize the transaction verification circuit 132 and/or the transaction analysis circuit 134 to determine if the transaction is valid. If the originating FI 106 determines that the transaction is valid at 518, the originating fi 106 transmits a processed transaction data packet 520 to the receiving FI 110. The processed transaction data packet 520 may include all the transaction data required to complete the transaction. In some arrangements, the processed transaction data packet 520 includes all the information required to complete the transaction as understood by the originating FI 106. In some arrangements, the originating FI 106 may be in communication with the receiving FI 110 to ensure that all required information is provided prior to transmitting the processed transaction data packet 520. Once the receiving FI 110 receives the processed transaction data packet 520, the transaction is completed at 522.

If the originating FI 106 determines that the transaction is not valid at 518, the originating FI 106 then determines if the error is automatically repairable 524. In one embodiment, the transaction correction circuit 136 evaluates the defects associated with the received request to determine if the transaction request can be automatically repaired. For example, where the transaction is missing information, such as PII information, the transaction correction circuit 136 may access the originator profile 126, as described above, to determine if the information is available to be used in correcting any defects associated with the transaction request. If an automatic fix is determined to be available, the originating FI 106 repairs the transaction information (i.e. the data within the transaction data packet 514) to cure the defects at 526. Modifying the requested transaction can include providing the missing information previously provided by the originator 104. Once the requested transaction has been repaired, and the defects corrected, the originating FI 106 transmits a repaired processed transaction data packet 528 to the receiving FI 110. The receiving FI 110 may receive the repaired processed transaction data packet 528 and complete the transaction at 522, as described above.

If the originating FI 106 determines that an automatic fix is not available, the originating FI 106 generates an error report 530. The error report 530 may be transmitted to the originator 104. For example, the error report 530 may be transmitted to the user device 102, for accessing by the originator 104. In some arrangements, the error report 530 may provide an indication that the transaction request is manually repairable. If the originating FI 106 determines that the transaction is manually repairable, the originating FI 106 may provide instructions within the error report 530 regarding how the originator 104 can repair the transaction request. In one embodiment, the error report 530 may be configured to include one or more inputs that allow the originator 104 to provide the required information, and cure the subsequent defects. At process block 532, the originator 104 may manually repair the transaction by providing the additional information requested in the error report 530. The originator 104 may then generate a transaction data packet 514 and transmit the transaction data packet 514 to the originating FI 106, as previously described above. The transaction data packet 514 may then be processed at process block 516 to determine if the transaction is valid.

Figure 6:
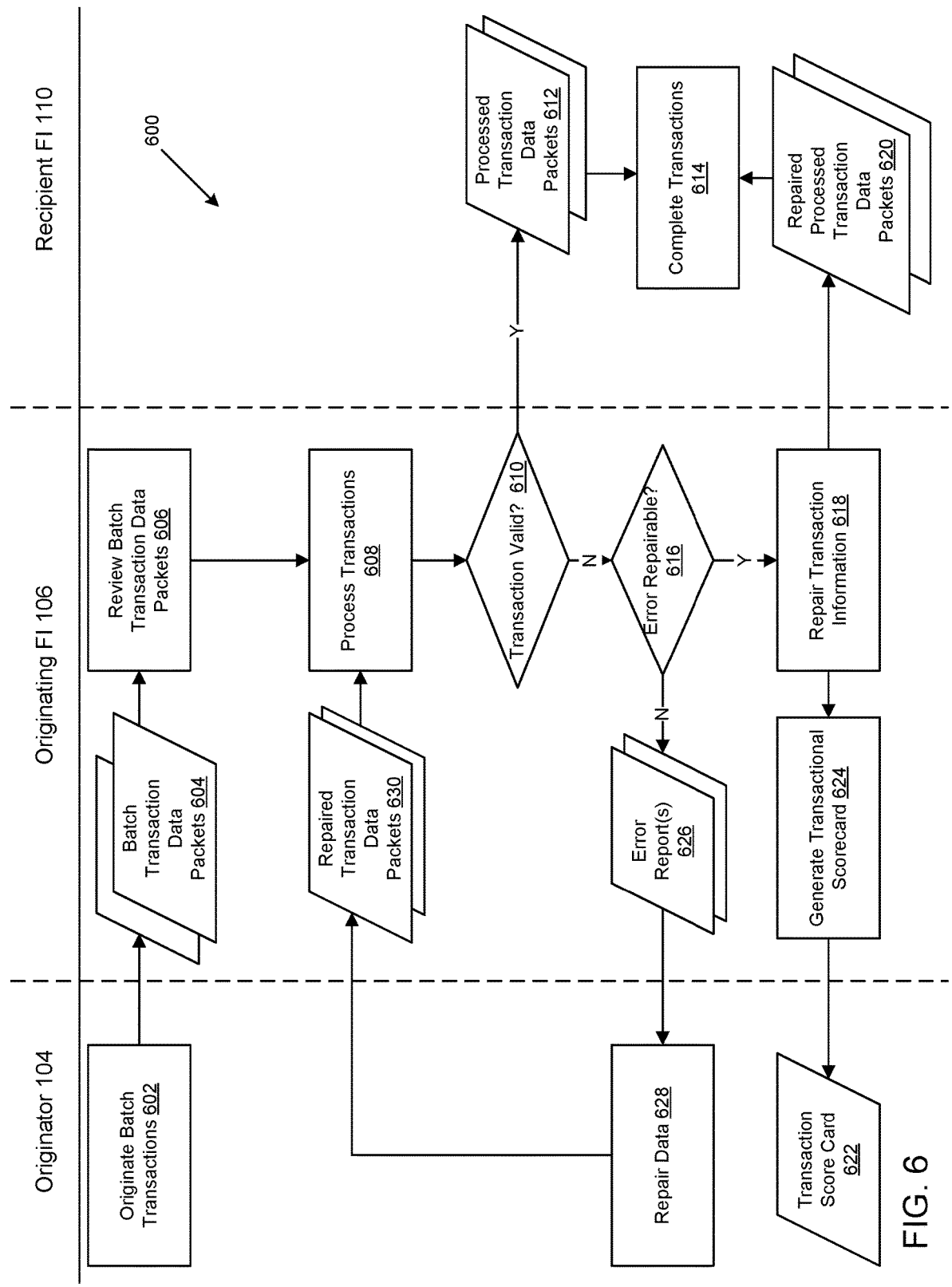
FIG. 6 is a flow diagram illustrating an example implementation of the method shown in FIG. 4.

FIG. 6 is a flow diagram illustrating an example implementation 600 of the method shown in FIG. 4. For clarity and brevity, the implementation 600 is discussed below in connection with the system described in FIG. 1. Specifically, in regards to the originator 104, the originating FI 106 and the receiving FI 110. The originator 104 originates a group of transactions, herein referred to as a batch transaction at 602. In one embodiment, the originator 104 can originate the transaction by providing one or more batch transaction data packets 604 to the originating FI 106. The batch transaction data packets 604 may include transactional data for each transaction within the batch transaction, such as originator identity information, transaction specific information, and/or recipient specific information requirements, as described above. However, it is contemplated that the batch transaction data packets 604 may include more data or less data, as applicable. In one embodiment, the originator 104 may provide the batch transaction data packets 604 via the user device 102. For example, the originator 104 may enter all the information associated with the transaction using the FI app 122. In some arrangements, the batch transaction data packets 604 may simply include a request to perform a certain type of transaction, along with basic data related to the transaction, such as the type of transaction, the parties, and information associated with the parties. However, in other arrangements the originator 104 may provide the batch transaction data packets 604 using other means, such as via a web-portal associated with the originating FI 106, or even by providing paper documents directly to the originating FI 106.

The originating FI 106 can review the batch transaction data packets 604 provided by the originator 104 at 606. For example, the originating FI 106 may evaluate the type of transaction to determine what additional information might be necessary. The originating FI 106 may also evaluate other parameters associated with the batch transaction data packets 604, such as the parties, and the countries involved in the transaction. In one embodiment, the review is performed by the transaction verification circuit 132. In other arrangements, the transaction form generation circuit 130 may review the transactional data provided by the originator 104.

Once the batch transaction data packets 604 have been reviewed, the originating FI 106 processes each transaction within the batch transaction at 608. In one embodiment, the originating FI 106 processes the transaction based on the transactional data within the batch transaction data packets 604. Further, processing the transaction may include determining if the transactions are valid. In one embodiment, the originating FI 106 determines if the transaction is valid via the transaction verification circuit 132 and/or the transaction analysis circuit 134, as described above. Specifically, the originating FI 106 looks to the transaction data provided by the originator 104 in the batch transaction data packets 604, along with the type of transaction being requested. For example, the originating FI 106 may determine the type of transaction and the recipient of the transaction based on information provided within the batch transaction data packets 604. Based on the transaction type and intended recipient, the originating FI 106 can validate the transaction data.

The originating FI 106 determines if the transactions are valid, based on the data in the batch transaction data packets 604 at 610. Similar to above, the originating FI 106 may utilize the transaction verification circuit 132 and/or the transaction analysis circuit 134 to determine if the transaction is valid. In one embodiment, the originating FI 106 determines if each transaction within the batch transaction is valid on an individual basis. If the originating FI 106 determines that a transaction is valid at process block 610, the originating FI 106 transmits a processed transaction data packets 612 to the receiving FI 110 for each valid transaction. The processed transaction data packets 612 may include all the transaction data required to complete the transaction. In some arrangements, the processed transaction data packets 612 include all of the information required to complete the transaction as understood by the originating FI 106. In some arrangements, the originating FI 106 may be in communication with the receiving FI 110 to ensure that all required information is provided prior to transmitting the processed transaction data packets 612. Once the receiving FI 110 receives the processed transaction data packets 612, the transaction is completed at 614.

If the originating FI 106 determines that one or more transactions are not valid at 610, the originating FI 106 then determines if the error is automatically repairable at 616. In one embodiment, the transaction correction circuit 136 evaluates the defects associated with the received request to determine if the request can be automatically repaired. For example, where the transaction is missing information, such as PII information, the transaction correction circuit 136 may access the originator profile 126, as described above, to determine if the information is available to be used in correcting any defects associated with the transaction request. If an automatic fix is determined to be available, the originating FI 106 repairs the transaction information (i.e. the data within the batch transaction data packets 604) to cure the defects at 618. Modifying the requested transactions can include providing the missing information previously provided by the originator 104. Once the requested transaction has been repaired, and the defects corrected, the originating FI 106 transmits a repaired processed transaction data packet 620 to the receiving FI 110 for each repaired transaction. The receiving FI 110 may receive the repaired processed transaction data packet 620 and complete the transaction at 614, as described above.

Additionally, once the originating FI 106 repairs the transactions at 618, the originating FI 106 can then generate a transactional scorecard 622 at 624. The transactional scorecard 622 may include a score indicating a financial competence of the originator 104 based on the processed transactions. In one embodiment, the transaction score generator 138 is configured to generate a scorecard for each transaction requested by the originator 104. In one embodiment, the score is associated with the number of defects associated with the each requested transaction. The scores may be used to provide a baseline of financial competence associated with the originator 104. For example, if the originator 104 consistently achieves low scores, indicating multiple defects associated with a requested transaction, the originating FI 106 may modify the information requested from the originator 104 before a transaction is processed. In other arrangements, if the originator 104 consistently achieves low scores, indicating multiple defects associated with a requested transaction, the originating FI 106 may restrict the types of transactions that the originator 104 is allowed to request. For example, where the originator 104 has consistently low scores, the originating FI 106 may not allow the originator 104 to perform batch transactions. In other arrangements, if the originator 104 has consistently high scores, the originating FI 106 may allow the originator 104 to perform certain transactions, such as batch transactions in the future. In some arrangements, the transaction score generator 138 generates scores for different types of transactions. For example, the originator 104 may have high scores for transaction to one country, but low scores for transactions to another country. Thus, the originating FI 106 may require the originator 104 to provide additional information when requesting transactions with a country associated with a low score. For example, the transaction form generation circuit 130 may highlight a field associated with data that is commonly not provided, or incorrectly provided. This can help to ensure that the originator 104 provides the correct information initially to the originating FI 106 when requesting the transaction.

If the originating FI 106 determines that an automatic fix is not available at 616, the originating FI 106 generates an error report 626 for each transaction that cannot be automatically repaired. The error report 626 can be transmitted to the originator 104. For example, the error report 626 may be transmitted to the user device 102, for accessing by the originator 104. In some arrangements, the error report 626 may provide an indication that the transaction request is manually repairable. If the originating FI 106 determines that the transaction is manually repairable, the originating FI 106 may provide instructions within the error report regarding how the originator 104 can repair the transaction request. In one embodiment, the error report 626 may be configured to include one or more inputs that allow the originator 104 to provide the required information, and cure the subsequent defects. At process block 628, the originator 104 may manually repair the transaction by providing the additional information requested in the error report 626. The originator 104 may then generate a repaired transaction data packet 630 for each repaired transaction, and transmit the repaired transaction data packet 630 to the originating FI 106, as previously described above. The repaired transaction data packet 630 may then be processed at 608 to determine if the transaction is valid. In some instances, the only way to repair the transaction is for the originator 104 to originate a new transaction, which may be indicated within the error report. For example, where the errors are too substantial to be repaired, the error report can indicate that the error is not repairable, and provide an indication to the originator 104 of their critical, as well as non-critical, errors were to allow for the originator 104 to correct the defects in a subsequent transaction request.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively, or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:
1. A computer-implemented method performed by a global transaction processing system, the method comprising:
based on prior interactions with an originator, determining a plurality of personal identifying information (PII) items related to the originator;
generating an originator profile, the originator profile comprising the plurality of PII items related to the originator;
generating and displaying, via an originator computing device, an electronic form structured to allow the originator to designate a subset of the plurality of PII items as automatically accessible by a transaction correction circuit to repair, without requesting originator approval, future transactions requested by the originator;
based on an originator input received from the originator computing device, storing the subset of the plurality of PII items in the originator profile;
receiving a first batch comprising a plurality of transaction requests from the originator, each transaction request comprising transactional data including one or more of originator account information, originator identification information, a transaction amount, a transaction recipient, and transaction recipient account information;
for at least one of the plurality of transaction requests:
validating the transactional data to determine one or more parameters associated with the requested transaction, wherein the one or more parameters include one or more of a transaction type, a recipient identity, and a recipient location, and wherein the one or more parameters is indicative of at least one transaction defect;
dynamically generating a transaction information request form, the transaction information request form including one or more requests for specific transactional data from the originator based on the one or more parameters associated with the requested transaction;
receiving, via the transaction information request form, the requested specific transactional data from the originator;
determining that the transaction request is automatically repairable based on required data being accessible via the subset of the plurality of PII items from the originator profile;
automatically repairing the transaction request using the subset of the plurality of PII items from the originator profile;
generating a data packet containing the transactional data and the requested specific transactional data, wherein the data packet is structured to be readable by a receiving financial institution associated with the transaction recipient;
transmitting the data packet containing the transactional data and the requested specific transactional data to the receiving financial institution associated with the transaction recipient; and
generating a score for the plurality of transactions, the score based on the at least one transaction defect for each transaction; and
based on the score, limiting a size of a second batch for future transactions associated with the originator.
2. The method of claim 1, further comprising:
validating the transaction request to determine if the transaction request is valid;

when the transaction request is determined to be valid, then:
processing the transaction request, comprising generating one or more data messages containing the transactional data and the requested specific transactional data, the one or more data messages configured to be readable by the receiving financial institution associated with the transaction recipient;
when the transaction request is determined to be invalid, then:
determining if the transaction request is automatically repairable based on the transaction request being determined to be invalid;
automatically repairing the transaction request based on the invalid transaction request being determined to be able to be automatically repaired; and
generating an error report based on the invalid transaction request being determined to be unable to be automatically repaired.

3. The method of claim 2, wherein the error report comprises one or more of a list of missing transactional data and incorrect transactional data, wherein the missing transactional data and the incorrect transactional data are determined to be the cause of the transaction request being invalid.

4. The method of claim 3, wherein the error report is an electronically generated report having one or more originator configurable inputs associated with at least one of the missing transactional data and the incorrect transactional data, the one or more inputs configured to allow the originator to modify the missing transactional data and the incorrect transactional data to manually repair the transaction request.

5. The method of claim 4, further comprising receiving the manually repaired transaction request; and
processing the repaired transactional request.

6. The method of claim 1, wherein the requested specific transactional data comprises at least one of originator identity information, transaction specific information, and recipient specific information requirements.

7. The method of claim 6, wherein the recipient specific information includes recipient country specific information.

8. A system for processing global transactions, the system comprising:
an originating financial institution computing system associated with an originating financial institution configured to:
based on prior interactions with an originator, determine a plurality of personal identifying information (PII) items related to the originator;
generate an originator profile, the originator profile comprising the plurality of PII items related to the originator;
generate and display an electronic form structured to allow the originator to designate a subset of the plurality of PII items as automatically accessible by a transaction correction circuit to repair, without requesting originator approval, future transactions requested by the originator;
based on an originator input received from the originator computing device, store the subset of the plurality of PII items in the originator profile;
receive a first batch comprising a plurality of global transaction requests from a user device, each global transaction request comprising transactional data including one or more of originator account information, originator identification information, a transaction amount, a transaction recipient, and transaction recipient account information;
for at least one of the plurality of global transaction requests:
validate the transactional data to determine one or more parameters associated with the global transaction request, wherein the one or more parameters include one or more of a transaction type, a recipient identity, and a recipient location, and wherein the one or more parameters is indicative of at least on transaction defect;
dynamically generate a transaction information request form, the transaction information request form comprising input fields generated based on one or more requests for specific transactional data from the originator, the one or more requests corresponding to the one or more parameters;
receive, via the transaction information request form, the requested specific transactional data from the originator;
determine that the transaction request is automatically repairable based on required data being accessible via the subset of the plurality of PII items from the originator profile;
automatically repair the transaction request using the subset of the plurality of PII items from the originator profile;
generate a data packet containing the transactional data and the requested specific transactional data, wherein the data packet is structured to be readable by a receiving financial institution associated with the transaction recipient;
transmit the data packet containing the transactional data and the requested specific transactional data to the receiving financial institution associated with the transaction recipient; and
generate a score for the plurality of transactions, the score based on the at least one transaction defect for each transaction; and
based on the score, limit a size of a second batch for future transactions associated with the originator.

9. The system of claim 8, wherein the originating financial institution computing system is further configured to:
validate the transaction request to determine if the transaction request is valid;
when the transaction request is determined to be valid, then:
process the transaction request, comprising generating one or more data messages containing the transactional data and the requested specific transactional data, the one or more data messages configured to be readable by the receiving financial institution associated with the transaction recipient;
when the transaction request is determined to be invalid, then:
determine if the global transaction request is automatically repairable based on the transaction request being determine to be invalid;
automatically repair the global transaction request based on the invalid transaction request being determined to be able to be automatically repairable; and
generate an error report based on the invalid global transaction request being determined to be unable to be dynamically repaired, wherein the generated error report is transmitted to the originator.

10. The system of claim 9, wherein the error report comprises one or more of a list of missing transactional data and incorrect transactional data, the missing transactional data and the incorrect transactional data determined to be the cause of the transaction requested being invalid.

11. The system of claim 10, wherein the error report is an electronically generated report having one or more inputs associated with one or more of the missing transactional data and the incorrect transactional data, the one or more inputs configured to allow the originator to modify the missing transactional data and the incorrect transactional data to manually repair the transaction request.

12. The system of claim 11, wherein the originating financial institution computing system is further configured to receive the manually repaired transaction request; and process the repaired transactional request.

13. The system of claim 9, wherein the originating financial institution computing system is further configured to automatically repair the invalid global transaction request by accessing the originator profile, and modify the global transaction request with additional information required to repair the global transaction request, wherein the additional information is stored in the originator profile.

14. The system of claim 8, wherein the requested specific transactional data comprises at least one of originator identity information, transaction specific information, and recipient specific information requirements.

15. The system of claim 14, wherein the recipient specific information includes recipient country specific information.

16. The system of claim 8, wherein the originating financial institution computing system is further configured to transmit the transaction information form to the user device; and receive requested specific transactional data from the user device.

17. A global transaction processing system, the system comprising:
an originating financial institution computing system, the originating financial institution computing system configured to:
based on prior interactions with an originator, determine a plurality of personal identifying information (PII) items related to the originator;
generate an originator profile, the originator profile comprising the plurality of PII items related to the originator;
generate and display, via an originator computing device, an electronic form structured to allow the originator to designate a subset of the plurality of PII items as automatically accessible by a transaction correction circuit to repair, without requesting originator approval, future transactions requested by the originator;
based on an originator input received from the originator computing device, store the subset of the plurality of PII items in the originator profile;
receive a first batch comprising a plurality of global transaction request from a user device, each global transaction request comprising transactional data including one or more of originator account information, originator identification information, a transaction amount, a transaction recipient, and transaction recipient account information;
for at least one of the plurality of global transaction requests:
validate the transactional data to determine one or more parameters associated with the global transaction request, wherein the one or more parameters is indicative of at least one transaction defect;
dynamically generate a transaction information request form, the transaction information request form comprising input fields generated based on one or more requests for specific transactional data from the originator, the one or more requests corresponding to the one or more parameters;
receive, via the transaction information request form, the requested specific transactional data from the originator;
determine that the transaction request is automatically repairable based on required data being accessible via the subset of the plurality of PII items from the originator profile;
automatically repair the transaction request using the subset of the plurality of PII items from the originator profile;
generate a data packet containing the transactional data and the requested specific transactional data, wherein the data packet is structured to be readable by a receiving financial institution associated with the transaction recipient;
transmit the data packet containing the transactional data and the requested specific transactional data to the receiving financial institution associated with the transaction recipient; and
generate a score for the plurality of transactions, the score based on the at least one transaction defect for each transaction; and
based on the score, limit a size of a second batch for future transactions associated with the originator;
validate the transaction request to determine if the global transaction request is valid;
in response to the global transaction request being determined to be a valid transaction request:
process the transaction request, comprising generating one or more data messages containing the transactional data and the requested specific transactional data, the one or more data messages configured to be readable by the receiving financial institution associated with the transaction recipient;
transmit the processed global transactional request to a recipient financial institution computing circuit.

18. The system of claim 17, comprising:
in response to the global transaction request being determined to be an invalid transaction request:
determine if the global transaction request is automatically repairable;
automatically repair the global transaction request based on the invalid global transaction request being determined to be able to be automatically repairable; and
generate an error report based on the invalid global transaction request being determined to be unable to be dynamically repaired, wherein the generated error report is transmitted to the originator and wherein the error report comprises one or more of a list of missing transactional data and incorrect transactional data, the missing transactional data and the incorrect transactional data determined to be the cause of the transaction requested being invalid.

19. The system of claim 18, wherein the error report is an electronically generated report having one or more user configurable inputs associated with one or more of the missing transactional data and the incorrect transactional data, the one or more inputs configured to allow the originator to input the missing transactional data and the incorrect transactional data to manually repair the transaction request.

20. The system of claim 19, wherein the originating financial institution computing system is further configured to receive the manually repaired transaction request; and process the repaired transactional request.

21. The system of claim 17, wherein the originating financial institution computing system is further configured to automatically repair the invalid global transaction request by accessing an originator profile, and modifying the global transaction request with additional information required to repair the global transaction request, wherein the additional information is stored in the originator profile.

22. The system of claim 17, wherein the requested specific transactional data comprises at least one of originator identity information, transaction specific information, and recipient specific information requirements.

23. The system of claim 22, wherein the recipient specific information includes recipient country specific information.

24. The system of claim 17, wherein the originating financial institution computing system is further configured to transmit the transaction information form to the user device; and receive the requested specific transactional data from the user device.

\* \* \* \* \*